(12) United States Patent  (10) Patent No.: US 7,709,739 B2
Ferragut et al.  (45) Date of Patent: May 4, 2010

(54) ELBOW CONNECTION FOR MULTIPLE-WIRE ELECTRIC CABLE

(75) Inventors: Eric Daniel Jose Ferragut, D'Huisson-Longueville (FR); Daniel Henri Goury, Sucy En Brie (FR); Anthony Claude Bernard Lorand, Vernon (FR)

(73) Assignee: Hispano Suiza, Colombes (FR)

( * ) Notice: Subject to any disclaimer, the term of this patent is extended or adjusted under 35 U.S.C. 154(b) by 0 days.

(21) Appl. No.: 12/090,156

(22) PCT Filed: Oct. 10, 2006

(86) PCT No.: PCT/FR2006/002261

§ 371 (c)(1),
(2), (4) Date: Apr. 14, 2008

(87) PCT Pub. No.: WO2007/042654

PCT Pub. Date: Apr. 19, 2007

(65) Prior Publication Data

US 2008/0308316 A1  Dec. 18, 2008

(30) Foreign Application Priority Data

Oct. 12, 2005 (FR) .................................. 05 10404

(51) Int. Cl.
*H02G 15/02* (2006.01)
(52) U.S. Cl. ................ 174/74 R; 174/77 R; 174/113 C
(58) Field of Classification Search ............... 174/71 R, 174/113 C, 74 R, 74 A, 77 R, 28
See application file for complete search history.

(56) References Cited

U.S. PATENT DOCUMENTS

| 1,089,642 | A | * | 3/1914 | Honold | 174/70 R |
| 1,940,917 | A | * | 12/1933 | Okazaki | 174/113 C |
| 4,343,844 | A | * | 8/1982 | Thayer et al. | 428/34.9 |
| 4,857,674 | A | | 8/1989 | Filbert | |
| 5,132,488 | A | | 7/1992 | Tessier et al. | |
| 6,107,574 | A | * | 8/2000 | Chang et al. | 174/77 R |
| 6,250,951 | B1 | * | 6/2001 | Milner et al. | 439/460 |
| 6,864,426 | B2 | * | 3/2005 | Miyazaki | 174/75 C |
| 6,943,300 | B2 | * | 9/2005 | Ekeberg et al. | 174/113 R |
| 7,371,967 | B2 | * | 5/2008 | MaHoney et al. | 174/117 F |
| 2004/0149483 | A1 | * | 8/2004 | Glew | 174/113 C |

FOREIGN PATENT DOCUMENTS

| DE | 92 18 768 | 10/1995 |
| EP | 0 578 961 | 1/1994 |
| EP | 0 711 007 | 5/1996 |

* cited by examiner

*Primary Examiner*—Chau N Nguyen
(74) *Attorney, Agent, or Firm*—Oblon, Spivak, McClelland, Maier & Neustadt, L.L.P.

(57) ABSTRACT

This invention relates to an elbow connection (10) for an electric cable (6) with several wires (5).

Figure 1:
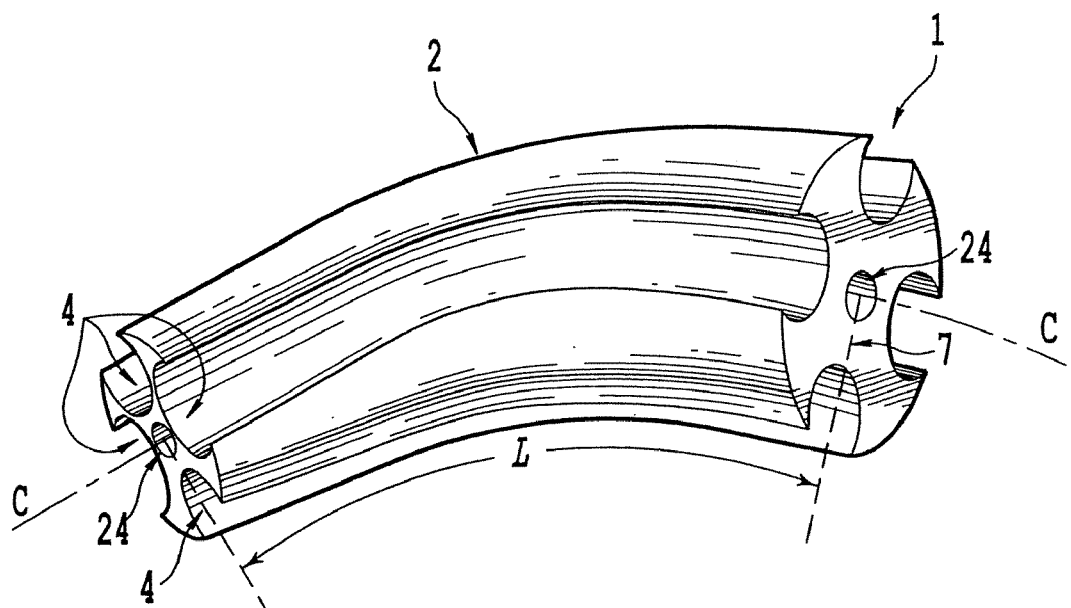

According to the invention, the connection (10) comprises a fluted central carrier (1) running longitudinally (L), made up of a flexible stem (2), comprising several substantially parallel recesses (4), and a strengthening rod (3), arranged at the core of the stem (2) and suitable for being bent.

19 Claims, 3 Drawing Sheets

ELBOW CONNECTION FOR MULTIPLE-WIRE ELECTRIC CABLE

BACKGROUND OF THE INVENTION

1. Field of the Invention

This invention relates to the field of electric cable connections with several electric wires and that of electric cable connectors in general.

2. Description of Related Art

Several electric cable connectors and various different electric cable connection arrangements are known.

This application is aimed at solving a problem which is often encountered during the laying of power cabling comprising several wide section supply wires in confined spaces. The problem is that the cabling has to bend with sharp changes in direction, sometimes immediately after exiting from the back of a connector, without being damaged.

Electric cable connectors are known which comprise an elbow connection comprising an elbow tubular conduit, which can be formed from one or two shells. For narrow section electric wires, particularly under one square millimeter, the elbow conduit can be formed from two shells made of plastic. To hold electric power supply cables containing several wide section wires, particularly over one square millimeter, elbow connections comprising a metal elbow conduit are used. These metal conduits can be part of an electrical connecting and mechanical coupling point. The conduit protects from mechanical damage from an external source (friction, crushing, shearing and impacts).

These metal connections and electric connectors have the drawbacks of being particularly heavy, bulky, expensive and inadaptable, a type of connection having to be chosen for each elbow unit angle desired.

SUMMARY OF THE INVENTION

The weight drawback of these connections is detrimental, particularly for aeronautical applications.

The object of the invention is to mitigate the drawbacks of the present-day solutions and to make a multiple-wire electric power cable connection with which it is possible to re-orientate the cable wires without subjecting them to mechanical force or damage, individual cabling and easy connection of each of these wires also being possible.

For this purpose, the following is provided according to the invention: an elbow connection system comprising a central part, forming a carrier or stiffener, this central carrier being formed from a flexible stem, particularly one made of silicone, of a substantially cylindrical shape before being bent and comprising several grooves formed in its surface in order each to accommodate a wire of the electric cable, the stem containing, inserted in its central part, a rigid rod, particularly a metal rod, capable of being bent so that the central carrier forms an elbow unit and so as to impose an orientation on the electric cable wires at the outlet from the connection. The central stiffener, provided with the electric cable wires accommodated in its recesses, can advantageously receive, at one end, a cylindrical element comprising several bores for passing the wires through and immobilizing them, can then be covered with shielding braid, one or more layers of sheathing and an external sheathing sleeve, particularly one which is heat shrinkable and/or can be provided with a ring or alternatively a threaded connection part and can finally form or be integrated in an electric cable connection point or connector.

The invention relates to an elbow connection for a multiple-wire electric cable, characterized in that it comprises a longitudinal fluted central carrier, made up of a flexible stem, comprising several longitudinal recesses spaced circumferentially on the surface of the stem and a strengthening rod arranged axially at the core of the stem and suitable for being bent.

Preferably, the strengthening rod is a rigid metal rod.

Preferably, the stem is made of a silicone-based material.

It is provided for that the stem is of substantially cylindrical geometry in the longitudinal direction.

More precisely, it is provided for that the stem is of slightly decreasing section longitudinally.

According to some advantageous features, each recess has a cross section in an arc of a circle of diameter D. Each recess has, on the stem surface, an opening of a width smaller than the recess diameter.

Furthermore, the connection can comprise elements for peripheral holding of wires in the said recesses, in particular, one or more of the following elements taken in isolation or in combination:

a cylindrical element comprising several holes bored parallel with the centre-line and corresponding, respectively, to the extension of the stem recesses or alternatively a barrel comprising several housings formed parallel with the centre-line and corresponding to the extension of the recesses, respectively, of the stem. Advantageously, the axial part of the barrel comprises a strengthening rod anchoring hole, particularly a threaded hole for fastening a threaded strengthening rod and/or an annular ring of a diameter greater than the stem and/or at least one shielding braid and/or at least one layer of peripheral sheathing, laid on the wires and/or even an external sheathing sleeve.

The sheathing can be heat shrinkable.

According to an additional feature, the elbow connection comprises a mechanical coupling part.

The invention also relates to an electric connector provided with such an elbow connection, in particular a connector for a multiple-wire electric cable, comprising such elbow connection parts and means of electric connection or coupling.

The invention also relates to an electric cable and/or an electric cabling harness comprising at least one such elbow connection.

BRIEF DESCRIPTION OF THE DRAWING(S)

Figure 2:
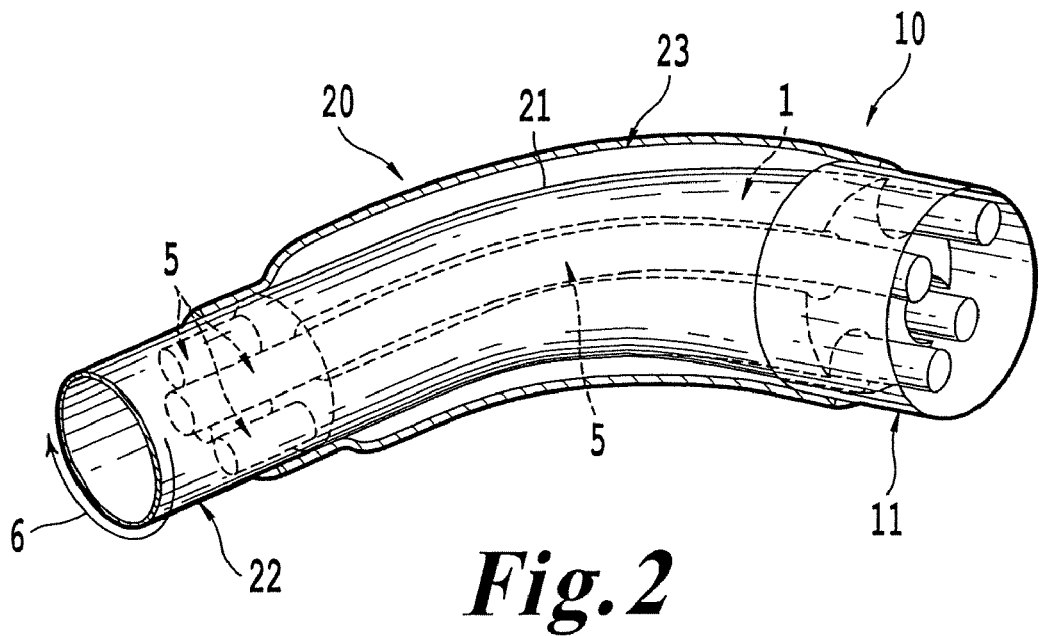
Figure 3:
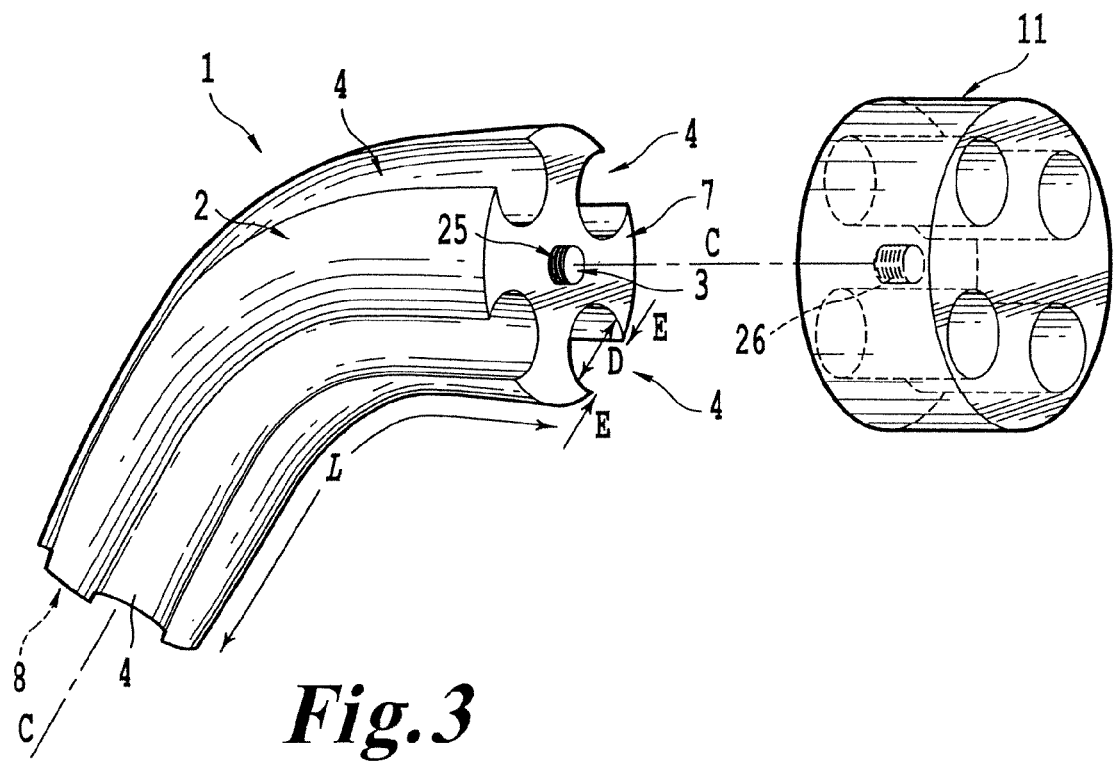
Figure 4:
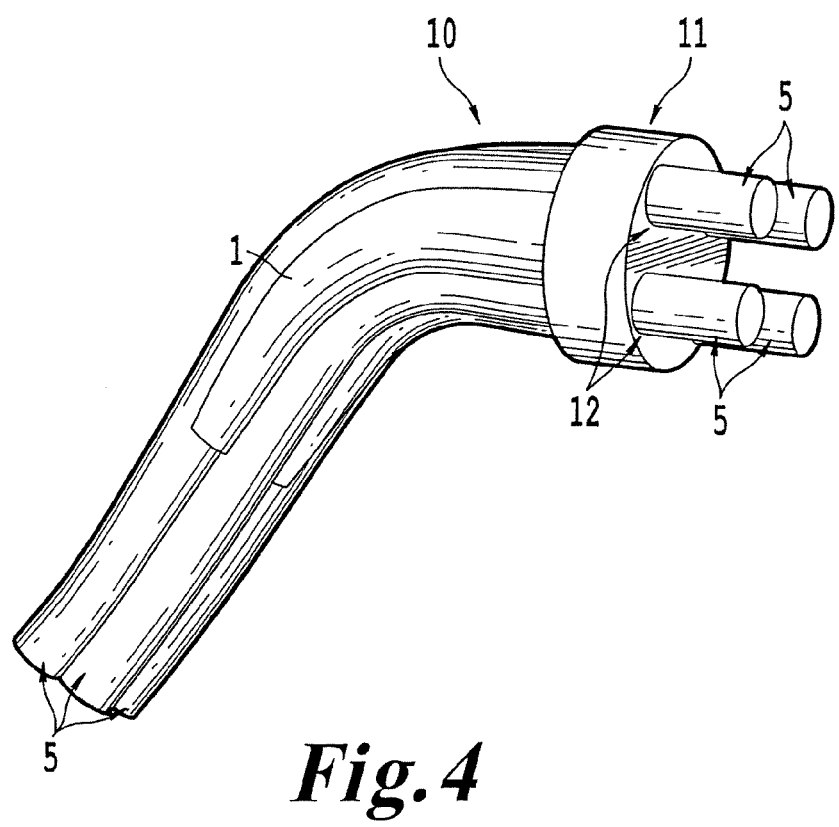
Figure 5:
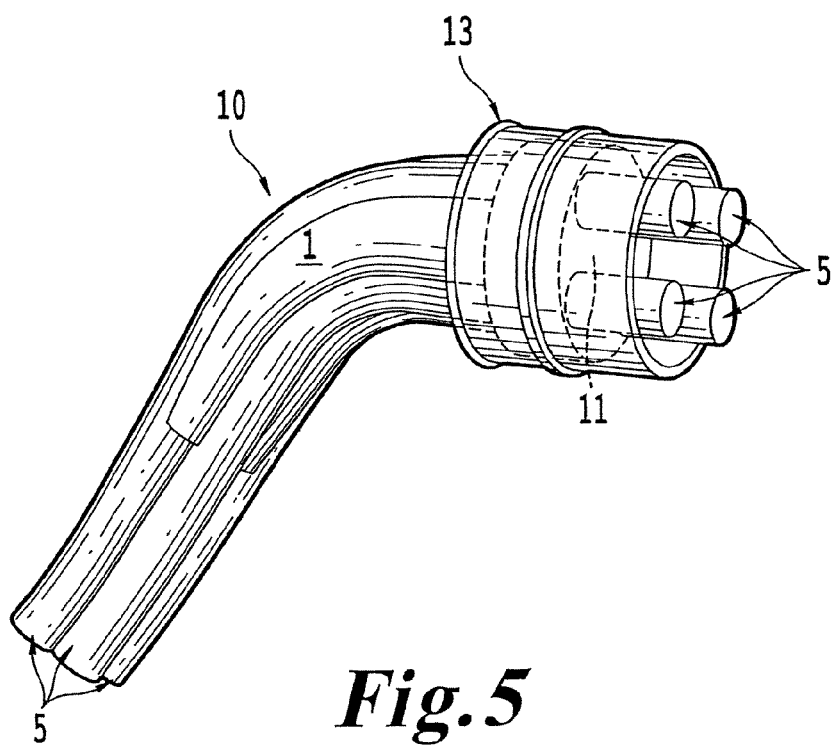
Figure 6:
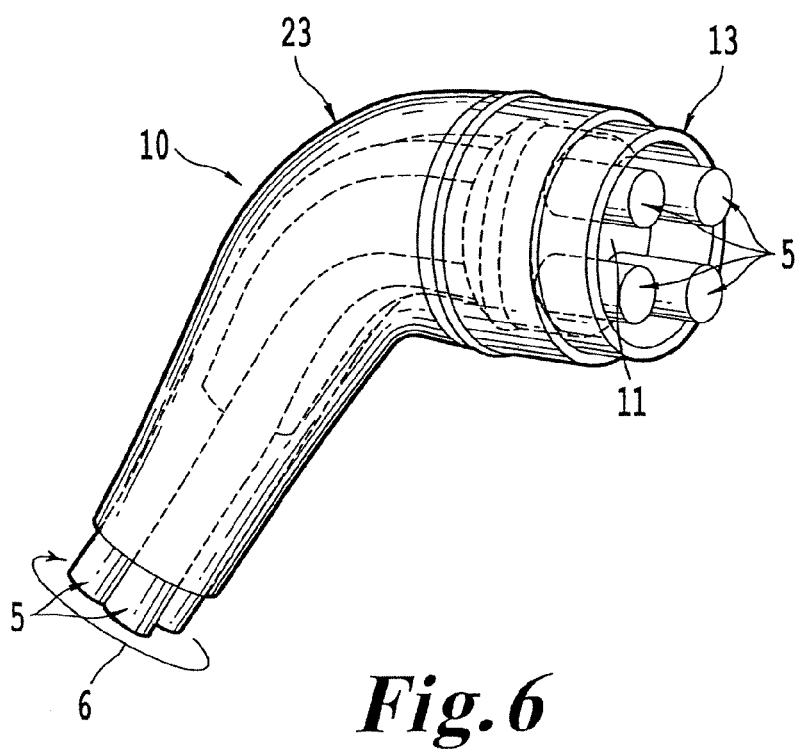

Other characteristics or advantages of the invention will appear clearly in the continuation of the description given by way of non-limiting example and with reference to the attached illustrations which show:

FIG. 1 is a side view of an elbow connection fluted central carrier according to the invention, FIG. 2 is a view of a complete general arrangement of an electric cable elbow connection according to the invention, FIG. 3 is another view of the central carrier showing the fluted stem, in which a strengthening rod is inserted before the insertion of electric cable wires to form an elbow connection according to the invention, FIG. 4 is a view of the elbow connection in FIG. 3 after insertion of electric cable wires in the fluted stem and in the holes of an attached cylindrical element, according to the invention, FIG. 5 is a view of the elbow connection in FIG. 4 inserted in a ring or a mechanical coupling part, according to the invention and FIG. 6 is a view of the elbow connection in FIG. 5 enclosed in a sheathing sleeve, according to the invention.

DETAILED DESCRIPTION OF THE PREFERRED EMBODIMENTS

FIG. 1 shows a fluted part 1, acting as a "carrier" or "stiffener" and forming the central element of an elbow connection according to the invention. The central carrier 1 is made up of a longitudinal fluted stem 2 with centre-line C at the core of which is arranged a hole 24 to accommodate an axial strengthening rod 3, the whole being bent to give its shape to the central carrier 1 and to the elbow connection.

With the fluted recesses 4 of the central carrier, it is possible to accommodate individually several electric cable wires 5, of which there are four here, as shown in FIG. 2, in order to immobilize them and to impose on them an elbow unit direction C according to the invention.

FIG. 2 thus shows that the fluted carrier 1 in FIG. 1, which forms the central element of an elbow connection 10 according to the invention, receives several electric wires 5 accommodated in the grooves 4 formed on its periphery and that the electric wires 5 are immobilized by holding elements.

The embodiment in FIG. 2 shows that the elbow connection 10 is provided with a set of optional holding elements, among which the following are highlighted:

a barrel 11 or cylindrical element with holes 12 bored through it, in the extension of the grooves 4 of the central carrier 1, in order to pass the electric wires 5 through, external covering elements 20, such as:

shielding braid 21 (single or over-braided), one or more layers of peripheral sheathing 22 laid on the wires 5, particularly on the cable 6 at the outlet 8 from the connection 10, layers of sheathing thus being able to cover all or part of the central carrier and/or a preferably sliding and heat shrinkable sheathing sleeve 23, longitudinally covering the coupling part 13 and preferably the length L of the central carrier 1, to which a ring (not shown) or a mechanical coupling part 13, visible in FIG. 5, can be added.

A complete electric connecting and/or mechanical coupling point comprising an elbow connection 10 according to the invention can thus be ultimately obtained.

The different parts and various stages with which it is possible to form an electric cable elbow connection according to the invention will now be detailed with reference to FIGS. 3 to 6.

As shown in FIG. 3, the central carrier 1 is made up of a relatively flexible stem 2, in which a strengthening rod 3, which is relatively rigid but capable of being bent, is arranged.

The fluted stem 2 is formed preferably from a silicone-based material. Silicones are particularly suitable for producing this due to their properties of flexibility and electrical insulation. Furthermore, a silicone is easy to mould or extrude, such that it is easily possible to produce a cylindrical shape formed with recesses 4 suitable for receiving, enveloping and moulding to the shape of the wires 5. The stem is preferably made of a fluorinated silicone, the addition of fluorine making it possible for silicone materials to withstand aeronautical fluids such as kerosene, oils or hydraulic control fluids ("skydroll").

Advantageously, such a silicone stem is suitable for protecting the electric wires 5 from mechanical impacts, crushing, shearing, wear by bending of the wire or by fretting and generally from deterioration.

The strengthening rod 3 is formed preferably from a flexible metal rod. The rod can be made particularly, by way of non-limiting example for information, from unhardened flexible steel, stainless steel (for example stainless steel AISI 300 to aeronautical standards), aluminium, titanium etc.

The rod 3 can be inserted in the hole 24 of the stem 2 prior to bending or alternatively arranged already bent in a mould before injection of the silicone based material to be moulded directly inside the stem 2.

The regions external to the periphery of the stem 2 are cut with fluted recesses 4 running in the longitudinal direction L of the stem.

The stem 2 can be of substantially cylindrical shape, before being bent, with substantially constant section obtained for example by extrusion or, preferably, with decreasing section (a slightly conical course) obtained by moulding, for example.

With a decreasing section, it is possible advantageously to have a first end 7, oriented towards an electrical connection coupling, of a section greater than a second end 8 allocated to the outlet of the cabling 6, i.e. to the outlet of the harness of electric wires 5.

At the first end 7, the fluted recesses 4 and therefore the electric wires 5 are spaced apart from one another, which simplifies their connection while keeping a good electrical insulation distance, necessary in particular for electrical power connections.

At the second end 8, the recesses 4 converge and meet, with which it is possible advantageously to form a harness 6 of wires 5 tightly closed up at this second end 8 for the cabling outlet 6. Preferably, the recesses converge at the second end while remaining separated by a short distance, as can be seen in FIG. 1, for passing the rod 3 through. At the second end 8, the bottoms of the fluted recesses 4 can be almost in contact tangentially with one another and/or with the strengthening rod 3, as can be seen in FIG. 1, whereas, at the first end 7, the recesses 4 are spaced from the neighbouring recesses and from the central strengthening rod 3.

In the embodiment in FIGS. 1 to 6, the stem 2 with slightly decreasing section is truncated at the length L necessary for providing an elbow unit of the electric wires 5 with an acceptable level of curvature C.

In FIGS. 1 to 6, the stem 2 comprises curved grooves 4 inscribed in a plane and parallel with the guiding axial curve C of the stem 2, given physical form by the curved strengthening rod 3.

Alternatively, the recesses can wind in twisted helixes (not shown) developing according to the direction of the stem and overlapping, with which twisting of the electric wires can be started.

The cross section of the recesses is preferably in an arc of a circle, with which it is possible advantageously to insert easily and envelop perfectly wires 5 of circular section, immobilizing them.

As illustrated in FIG. 4, each of the electric wires 5 is inserted in the central carrier 1 through the external opening slot of a recess 4 and is accommodated inside the recess 4.

The recesses 4 advantageously have, on the surface of the stem 2, an opening of width E, smaller than their diameter D (or than the maximum transverse dimension of the recess), with which it is possible to hold the wires 5 inside.

FIG. 4 also shows that, to keep the wires 5 immobilized in the recesses 4, there is provision for attaching a barrel 11 comprising cable housings arranged parallel with the centre-line in the extension of the recesses. In the example in FIG. 4, the barrel 11 is made simply in the form of a disc or, more generally a cylindrical element, including holes 12 parallel with the centre-line of the element 11 and arranged in positions corresponding to the extension of the recesses 4 in the fluted stem 2 of the central carrier 1 of the elbow connection 10 according to the invention. Alternatively, the barrel can take the shape of a wheel or of a star shaped part which comprises a central hub and arms radiating around openings in the shape of a cradle (a rounded concave shape in a hollow, in a semi-circle, in a portion of a circle or of a cylinder) in order to accommodate the cables parallel with the centre-line.

The axial part of the barrel advantageously comprises a smooth or preferably threaded axial hole 26, for fastening and anchoring the axial strengthening rod 3 with threads 25. With this fastening point, it is possible to hold the rod, to immobilize it finally in its elbow unit angular position and to keep the cable in this position.

The barrel can be made from steel, particularly from stainless steel, from aluminium, titanium, copper or alternatively thermosetting plastic, especially PolyEtherEtherKetone (PEEK).

According to the illustration in FIG. 4, this cylindrical element 11, of a shape similar to a barrel or die, is attached to the end 7 of the fluted carrier 1 and slipped over the wires 5 of the electric cable 6, each wire 5 passing through a corresponding hole 12.

Advantageously, the holes 12 of the cylindrical element 11 keep the wires 5 immobilized and prevent them from coming out of the recesses 4 of the fluted carrier 1. FIG. 4 shows the arrangement of the cylindrical element 11 with space made in it for passing the wires 5 into the extension of the fluted carrier 1 of the connection 10 according to the invention. With such an arrangement, it is possible advantageously to combine radial insertion of the wires 5 into the recesses 4 with immobilization of the wires 5 by axial translational movement of the cylindrical element 11, with which it is possible for this assembly alone to immobilize the wires 5 without resorting to the external sheathing 20.

Alternatively or cumulatively, the wires 5 can be held in the recesses 4 by an annular ring (not shown) of a diameter greater than the stem 2 which is slid on the central carrier 1 after insertion of the electric cabling wires 5 to encircle them.

The assembly 10 formed by the central carrier 1 containing the wires 5 of electric cabling can in particular be covered with shielding and/or strengthening braid 21 before this ring is engaged to hold the braid 21.

FIG. 5 shows an embodiment in which the elbow connection is provided with a tube shaped mechanical coupling part 13. The part 13 is engaged on the assembly 10 formed by the central carrier 1 and the bored cylindrical element 11 in which the electric wires 5 are inserted.

The mechanical coupling part 13 is preferably made of a metal material in order to make the joint between the shielding braid and a connector metal external cylindrical wall connected to earth.

As illustrated in FIGS. 5 and 6, the mechanical coupling part 13 is preferably circular and/or cylindrical, at least partly. The coupling part 13 advantageously comprises an inside or outside thread or another means of assembly (bayonet, etc.).

With the coupling part 13, the elbow connection 10 can advantageously be secured with an external sheathing sleeve or sheath. The said part also allows the connection 10 according to the invention to be fastened to a connector or to a base to form an electrical socket or a complete electrical connection.

To immobilize all the parts of the connection 10 finally (in rotation and in translational movement) and to provide complete electrical insulation of the elbow connection according to the invention, the said elbow connection is preferably covered with insulating external sheathing, particularly such sheathing made of synthetic polymer material.

The external sheathing 20 can comprise one or more layers of sheathing 21, 22 and possibly a sheathing sleeve 23.

According to the embodiment which can be seen in FIG. 2, a sheath 22 covers the harness 6 of wires 5 of the electric cable coming from the second end 8 for the cabling outlet, opposite the first end 7, where mechanical coupling and electrical connections are carried out. The harness of electric wires 5 of the cable 6 can be embedded in one or more layers of sheathing 22 deposited by extrusion or taken into a heat shrinkable tubular sheath 22.

Such a sheath 22 can cover just the harness 6 of electric wires 5 (whether twisted or not) as illustrated in FIG. 2 and/or include all of the elements 1 to 6 of the elbow connection 10 according to the invention. The sheath 22 can be formed particularly from one or more layers of armoured, braided or over-braided sheathing.

The assembly of the elements of the elbow connection 10 (fluted carrier 1, wires 5/cylindrical barrel 11 with internal space created/ring/coupling part 13 and sheath 22, optionally) is preferably enclosed in an external sheathing sleeve 23.

The sheathing sleeve 23 can leave the mechanical coupling part 13 free to rotate. Preferably, the sheathing sleeve 23 is a heat shrinkable sleeve. The sleeve 23 is slipped on to the cable 6 before assembly of the elements 1 to 5 of the elbow connection 10 according to the invention and before the threaded coupling part 13 is screwed. The sheathing sleeve 23 is heat shrunk after the electric wires 5 have been arranged with all the elements of the elbow connection 10 and particularly after the mechanical coupling part 13 has been screwed.

Thus, advantageously, all the elements 1 to 13 of the elbow connection 10, particularly the wires 5 of the electric cable 6 and the mechanical coupling part 13, are completely immobilized in rotation and in axial translational movement.

Advantageously, the sheathing 20 gives mechanical protection from wear and damage.

More generally, with the structure of elbow connection 10 with central flexible stem 2 according to the invention, it is possible to obtain protection from mechanical impacts and particularly from crushing or shearing of the electric cable, while giving a progressive, regular curvature C of the electric wires 5 preventing their being cut and interruption to the electrical connection.

Advantageously, the bent metal strengthening rod 3 of the central carrier 1 gives an anchoring point and rigidity to the central carrier, which establishes the orientation C of the electric wires 5.

The essential benefit of the invention is to ensure the viability of the angle of orientation of the wires 5 of the electric cable 6 at the outlet from the elbow connection 10, which the sheathing alone cannot give, above all in electric power cables 6 comprising several wide section supply wires 5.

The invention can be applied particularly well to laying electric power cabling in restricted spaces in which the cables 6 have to bend with sharp changes in direction, sometimes immediately after the outlet from coupling points, while being completely protected from possible damage.

The invention can be applied in particular to forming power supply cabling in aeronautical equipment such as supply cables of the electrical equipment of engines or the power harnesses of turbo-engine thrust reversers.

What is claimed is:

1. An elbow connection for an electric cable with plural wires, comprising:
   a longitudinal fluted central carrier, including
      a flexible stem which is bent and made of a flexible material,
      plural longitudinal recesses spaced circumferentially on the surface of the stem,
      a strengthening rod which is bent and arranged axially at a core of the stem in a longitudinal direction, and
      wire holding elements for peripheral holding of wires in the recesses,
      wherein the wire holding elements include a barrel comprising plural housings formed parallel with a centerline and corresponding to an extension of the recesses, respectively, of the stem.

2. The elbow connection according to claim 1, wherein the strengthening rod is a rigid metal rod.

3. The elbow connection according to claim 1, wherein the stem is made of a silicone based material.

4. The elbow connection according to claim 1, wherein the stem includes a substantially cylindrical geometry in the longitudinal direction.

5. The elbow connection according to claim 1, wherein the stem includes a slightly decreasing section in the longitudinal direction.

6. The elbow connection according to claim 1, wherein each recess has a cross section in an arc of a circle of a diameter D.

7. The elbow connection according to claim 6, wherein each of the plural longitudinal recesses comprises, on a surface of the stem, an opening of width smaller than a diameter of the recess.

8. The elbow connection according to claim 1, wherein an axial part of a barrel comprises an axial hole for anchoring the strengthening rod.

9. The elbow connection according to claim 8, wherein the axial hole of the barrel and/or the strengthening rod includes a screw thread or screw threads.

10. The elbow connection according to claim 1, wherein the wire holding elements comprise an annular ring of a diameter greater than the stem.

11. The elbow connection according to claim 1, wherein the wire holding elements comprise at least one shielding braid.

12. The elbow connection according to claim 1, wherein the wire holding elements comprise at least one layer of peripheral sheathing laid on the wires.

13. The elbow connection according to claim 1, wherein the wire holding elements comprise an external sheathing sleeve.

14. The elbow connection according to claim 12, wherein the sheathing is heat shrinkable.

15. The elbow connection according to claim 1, further comprising a mechanical coupling part.

16. A connector for an electric cable, comprising an elbow connection according to claim 1.

17. An electric cable, comprising at least one elbow connection according to claim 1.

18. An electric cabling harness comprising at least one elbow connection according to claim 1.

19. The elbow connection according to claim 1, wherein the stem is configured to be molded directly onto the strengthening rod.

* * * * *